(12) United States Patent
Thorp et al.

(10) Patent No.: US 7,093,697 B2
(45) Date of Patent: Aug. 22, 2006

(54) HEAT SHIELD ASSEMBLY FOR AIRCRAFT WHEEL AND BRAKE ASSEMBLY

(75) Inventors: John H. E. Thorp, Tipp City, OH (US); Paul W. Sheidler, Bellbrook, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 11/324,977

(22) Filed: Jan. 3, 2006

(65) Prior Publication Data

US 2006/0119168 A1     Jun. 8, 2006

Related U.S. Application Data

(62) Division of application No. 10/268,606, filed on Oct. 10, 2002, now Pat. No. 7,051,845.

(60) Provisional application No. 60/328,875, filed on Oct. 10, 2001.

(51) Int. Cl.
F16D 55/02 (2006.01)
B60B 19/00 (2006.01)

(52) U.S. Cl. ..................... 188/71.6; 301/6.2

(58) Field of Classification Search .......... 301/6.1–6.3, 301/6.8, 6.91; 244/103 R; 188/71.5, 71.6, 188/18 A, 218 R, 233.3
See application file for complete search history.

(56) References Cited

U.S. PATENT DOCUMENTS

| | | |
|---|---|---|
| 3,051,528 A | 8/1962 | Rogers |
| 3,301,357 A | 1/1967 | Cussons et al. |
| 3,829,162 A | 8/1974 | Healy et al. |
| 3,887,041 A | 6/1975 | Malone |
| 3,958,833 A | 5/1976 | Stanton |
| 4,017,123 A | 4/1977 | Horner et al. |
| 4,084,857 A | 4/1978 | VanderVeen |
| 4,606,436 A | 8/1986 | Mery et al. |
| 4,944,370 A | 7/1990 | Chambers et al. |
| 5,002,342 A | 3/1991 | Dyko |
| 5,024,297 A | 6/1991 | Russell |
| 5,107,968 A | 4/1992 | Delpassand |
| 5,199,536 A | 4/1993 | Clark |
| 5,236,249 A | 8/1993 | Han et al. |
| 5,248,013 A | 9/1993 | Hogue et al. |
| 5,851,056 A | 12/1998 | Hyde |
| 6,003,954 A | 12/1999 | Everhard et al. |

FOREIGN PATENT DOCUMENTS

| | | |
|---|---|---|
| EP | 0 398 092 | 11/1990 |
| EP | 0 499 192 | 8/1992 |
| EP | 0 555 822 | 8/1993 |
| EP | 0 811 511 | 12/1997 |

Primary Examiner—Jason R. Bellinger
(74) Attorney, Agent, or Firm—Renner, Otto, Boisselle & Sklar, LLP

(57) ABSTRACT

A heat shield assembly for a wheel and brake assembly includes one or more torque bars that include a coupling device which cooperates with a portion of a heat shield (and more particularly heat shield sections) at a location axially outwardly remote from the inboard end of the heat shield so as to restrain radial outward movement of the heat shield. In another embodiment, the heat shield assembly includes heat shield carriers between which respective heat shield sections are axially inserted, and retainers are removably secured with respect to the carriers for blocking axial withdrawal of the heat shield sections from respective carriers. In another embodiment, heat shield carriers include a reversely bent edge portion defining a capture slot, and at least one aperture in the bent edge portion. A heat shield section has at one side thereof a first tab portion circumferentially inserted in the capture slot and at an opposite side thereof a second tab portion engaged in the aperture.

4 Claims, 14 Drawing Sheets

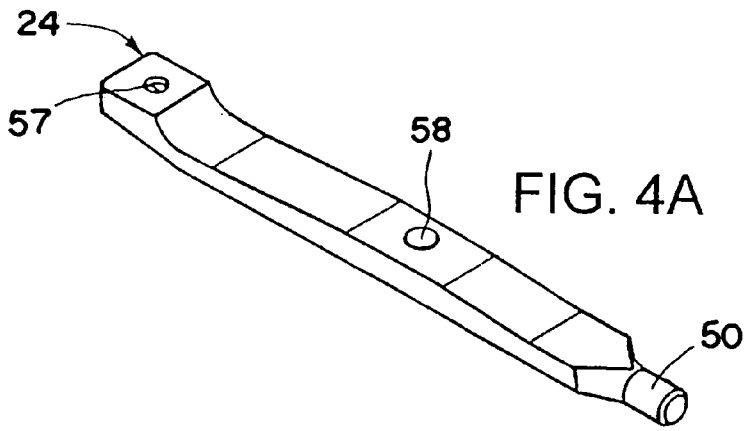
FIG. 4A
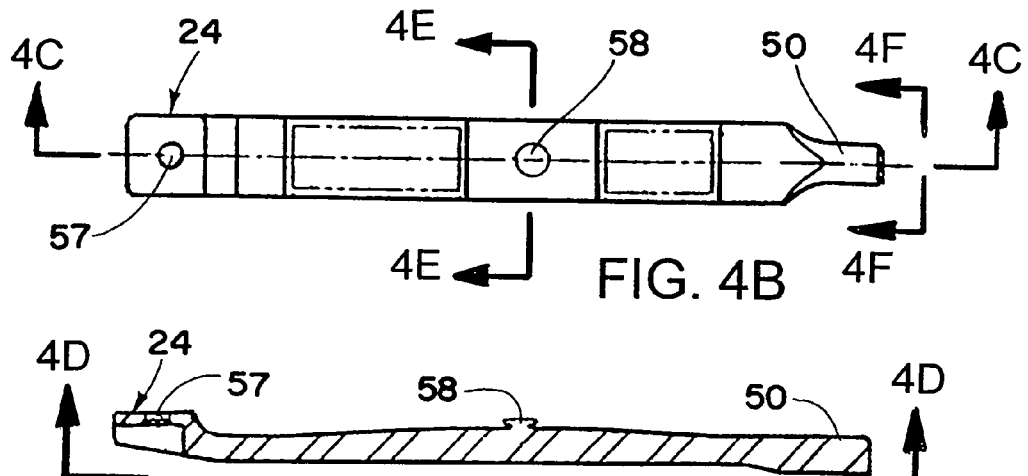
FIG. 4B
FIG. 4C
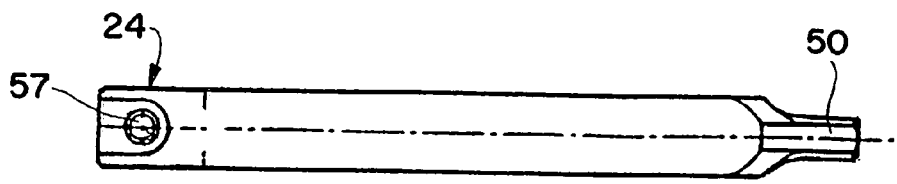
FIG. 4D
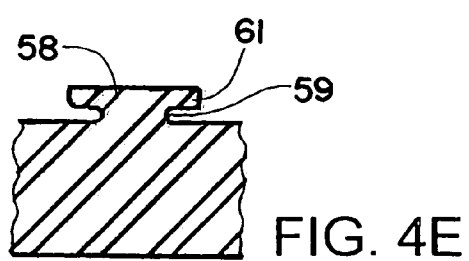
FIG. 4E
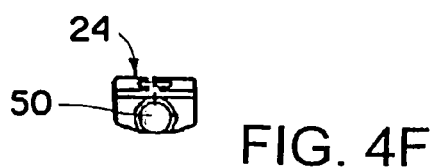
FIG. 4F

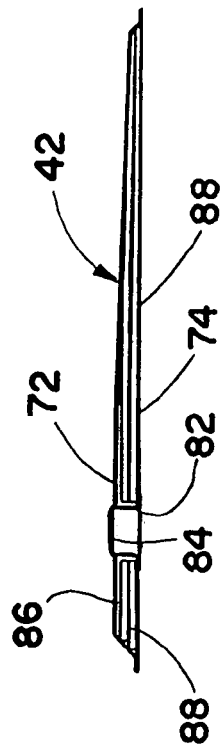
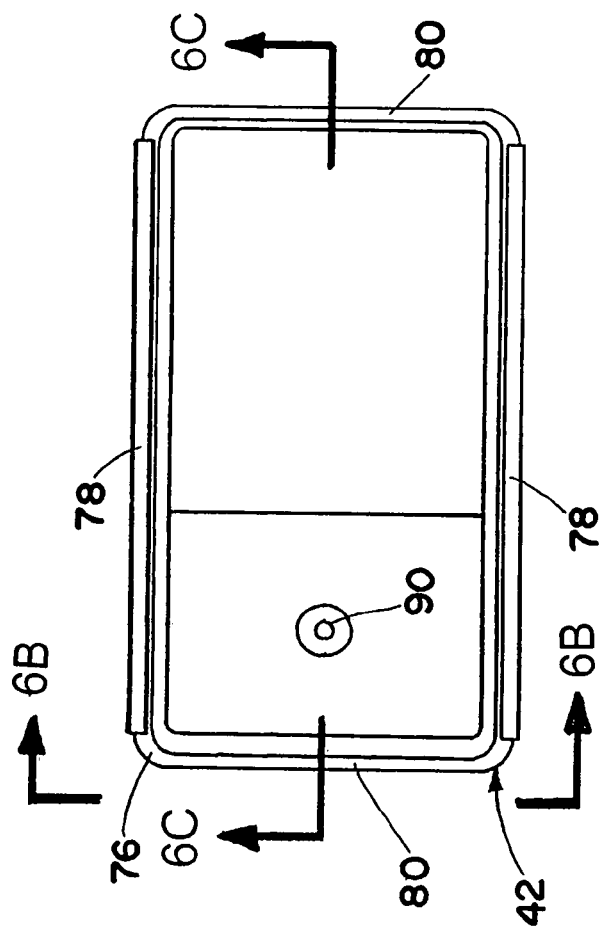
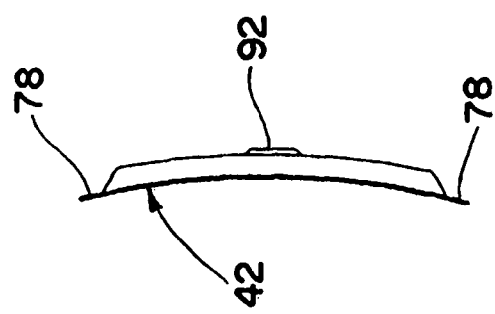

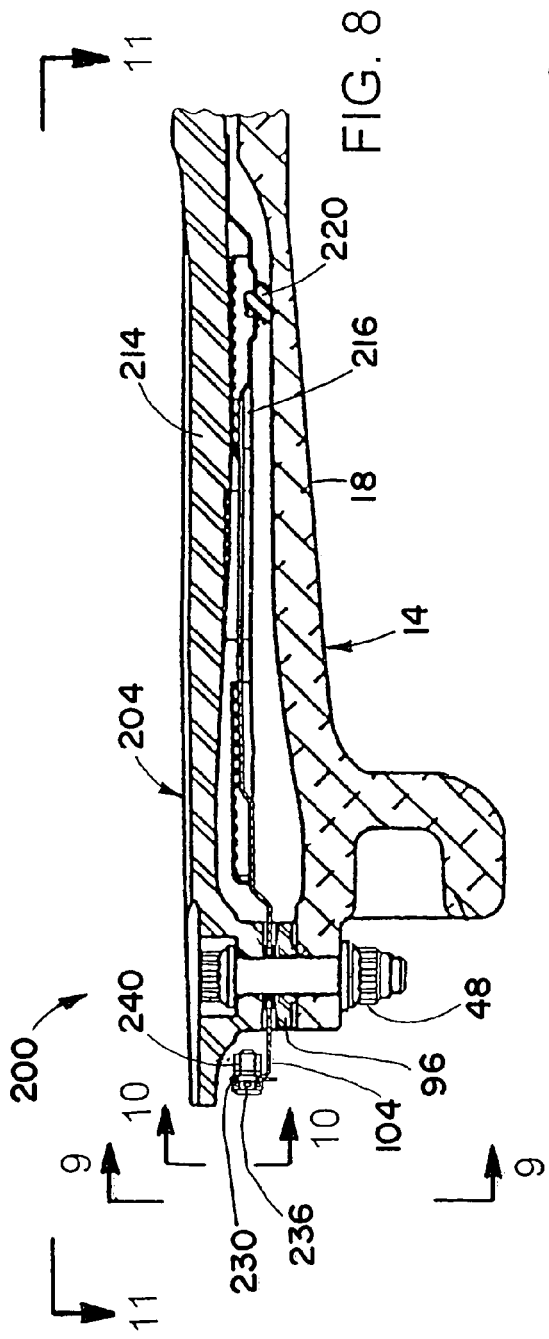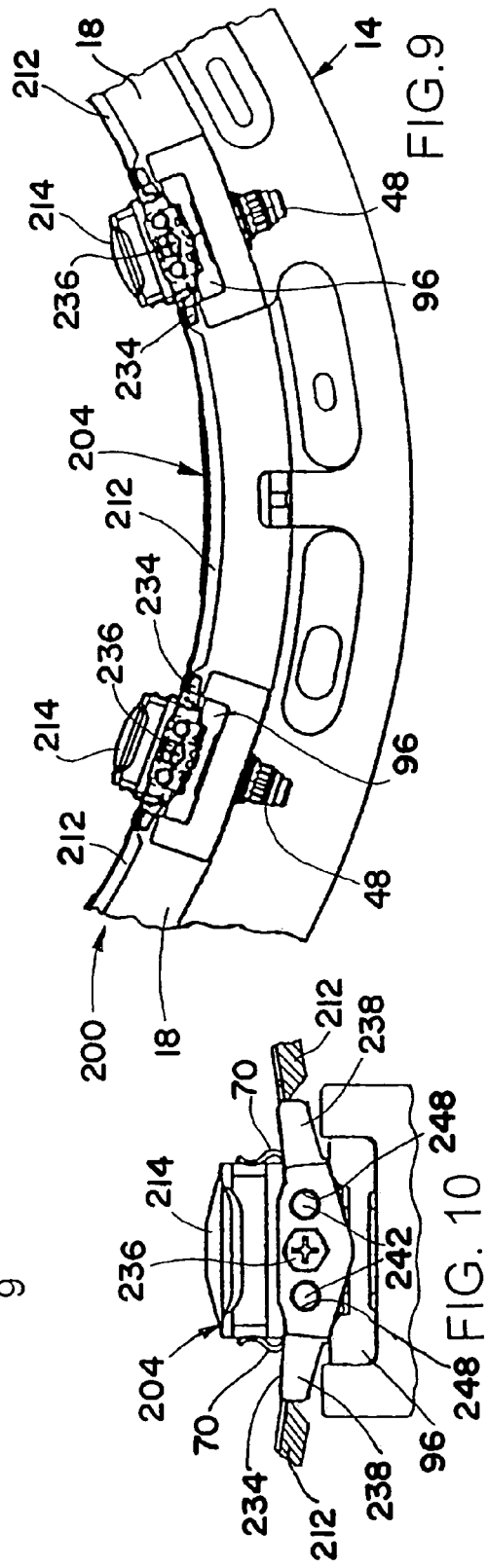

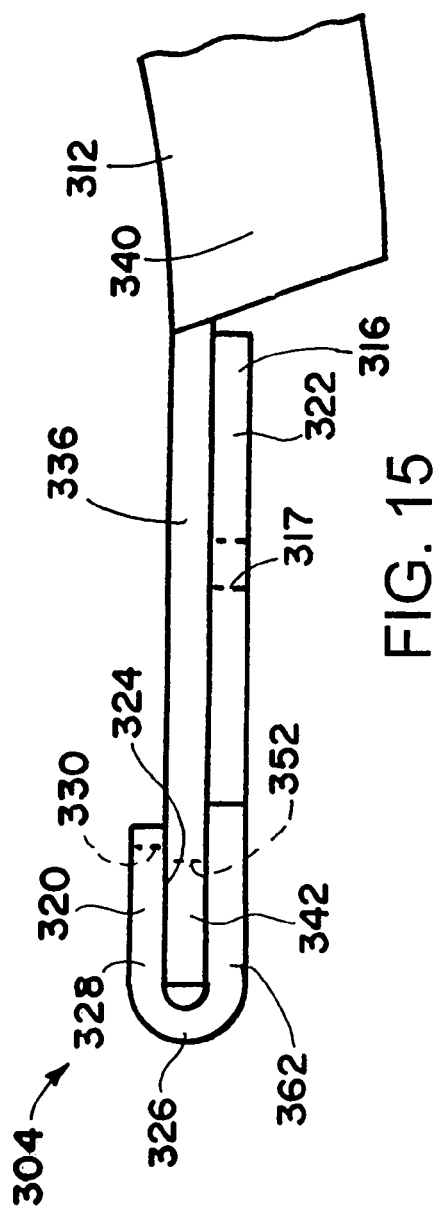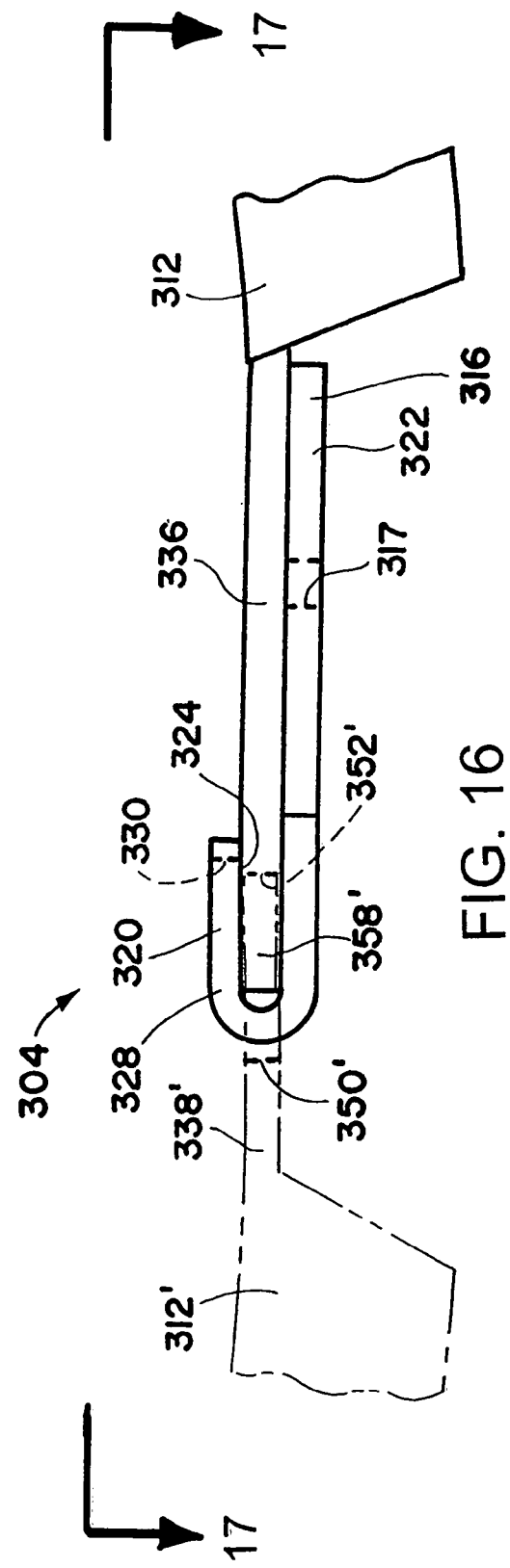

HEAT SHIELD ASSEMBLY FOR AIRCRAFT WHEEL AND BRAKE ASSEMBLY

This application is a divisional of U.S. patent application Ser. No. 10/268,606 filed on Oct. 10, 2002 now U.S. Pat. No. 7,051,845, which claims the benefit of U.S. Provisional Application No. 60/328,875 filed Oct. 10, 2001, both of which are hereby incorporated herein by reference in their entirety.

FIELD OF THE INVENTION

The invention herein described relates to aircraft wheel and brake assemblies and, more particularly, to improvements in heat shields and heat shield support structures.

BACKGROUND OF THE INVENTION

An aircraft wheel and brake assembly typically includes a heat shield disposed between the wheel and brake disks to prevent conduction and radiation to the aircraft wheel of heat energy generated in the brake disks during braking. Excessive temperatures in the aircraft wheel can damage the wheel and the aircraft tire. The heat shield also prevents hot brake material ejected from the brake disks during braking from being slung against the inside of the wheel, which can also damage the wheel and further contribute to excessive temperatures.

An early example of a heat shield is described by U.S. Pat. No. 3,051,528 issued in 1962 to R. R. Rogers. The Rogers heat shield comprises a multitude of curved heat shield sections disposed between adjacent drive keys. More recent examples are described by U.S. Pat. No. 4,017,123 issued in 1977 to Horner et al. and U.S. Pat. No. 4,084,857 issued in 1978 to VanderVeen. These heat shields also comprise curved heat shield sections disposed between adjacent drive keys. The Horner et al. heat shield sections are captive between the drive key caps and ledges formed on the drive keys. The ledges and drive keys are integrally formed with the wheel, which is typical of wheel and brake assemblies having steel disks. Horner et al. states that the heat shield sections could be used with the removable keys presented in Rogers. However, exactly how this would be accomplished is not clear because the Rogers drive keys do not have ledges or drive key caps. The VanderVeen heat shield section is captive between the drive key cap and an additional cap having a pair of wings that extend from either side of the drive key. The drive keys are integrally formed with the wheel, and wings eliminate the need for the ledges of Horner et al. The heat shields described thus far are representative of the technology developed for wheel and brake assemblies having steel brake disks with metallic friction linings.

The advent of carbon/carbon brake disks instigated further development of heat shields. Carbon/carbon brakes generally operate at a much higher temperature than their steel counter-parts, which necessitated further steps to minimize conduction and radiation of heat energy into the aircraft wheel. Most wheel and brake assemblies having carbon/carbon brakes now have removable torque bars that are spaced from the inside of the aircraft wheel, with attachments at both ends. This arrangement minimizes the conductive path from the torque bars to the wheel. Heat shield contact with the torque bars is preferably minimized for the same reasons. In addition, radiation is a major source of heat transfer from carbon/carbon brakes, which necessitates that the heat shield fully encircle the brake disks with minimum holes or breaks that permit direct radiation of heat energy to the aircraft wheel. Conduction is another major source of heat transfer in carbon/carbon brakes, which is minimized by minimizing contact of the torque bars and heat shield with the aircraft wheel. These considerations caused a significant departure from the earlier heat shield technology developed for steel brakes.

According to one prior art approach, a single piece full circle heat shield is attached to the wheel and brake assembly between the wheel and the torque bars. The heat shield is spaced from both the torque bars and the aircraft wheel in order to minimize heat conduction to the heat shield from the torque bars. The heat shield comprises two cylindrical stainless steel sheets spaced from each other, with insulation in between. A heat shield constructed in such manner, though certainly safe and effective, embodies some undesirable characteristics. For example, the shield tends to warp and buckle during use due to thermal expansion and contraction induced by braking cycles. In addition, removing a damaged heat shield generally requires removing all the torque bars from the aircraft wheel assembly.

Another heat shield is described in U.S. Pat. No. 5,002,342 issued in 1991 to Dyko. The Dyko shield comprises a plurality of heat shield sectors that together define a full circle heat shield. The edges of the heat shield are interleaved in a manner that permits relative expansion and contraction of the heat shield sectors induced by thermal gradients. Also, removal of a single heat shield requires only the removal of those torque bars corresponding to that sector. Thus, individual sectors may be removed and replaced as necessary without replacing the entire heat shield. A similar heat shield having sectors connected by hinged edges is described in U.S. Pat. No. 5,236,249 issued in 1993 to Han et al.

Further heat shield improvements are described in U.S. Pat. No. 5,851,056 issued in 1998 to Hyde. The Hyde heat shield comprises individual heat shield sections disposed between adjacent torque bars and elongate heat shield carriers superposing the torque bars and engaging the heat shield sections. With such an arrangement, the heat shield sections are removable without loosening or removing any torque bars.

Although the Hyde heat shield is an effective heat shield, it and similarly designed heat shields exhibit undesirable characteristics. Since the wheel acts as part of the pressure vessel to contain tire pressure, there is limited structure to which the heat shield sections and carriers can be mounted. For example, the heat shield sections and carriers of the Hyde heat shield are mounted at their axially inboard ends to the wheel flange and extend axially into the tube well. To provide support deep within the tube well, the heat shield carriers include resilient bumpers at their axially outboard ends. The resilient bumpers contact the tube well and restrain radial movement of the heat shield carriers and also the heat shield sections engaged by the carriers. During wheel spin up, the heat shield sections and carriers are forced radially outwardly and the resilient bumpers protect the tube well from being scored. However, over time the resilient bumpers have a tendency to degrade, which may cause the heat shield sections and/or carriers to contact and/or abrade the protective coatings of the tube well. Once the protective coating is removed, the wheel is susceptible to corrosion which can lead to the wheel being prematurely removed from service.

In addition to solving the problem of wheel scoring by other than the use of a bumper that is subject to degradation, there is a general need for further improvements in heat shield systems that provide for easier assembly and withdrawal of individual heat shield sections and/or improved performance of the heat shield.

SUMMARY OF THE INVENTION

The present invention provides several advances in the art of heat shield design and installation.

According to one aspect of the invention, a wheel and brake assembly comprises a wheel including a tube well having an inboard end and outboard end. At least one torque bar is attached to the tube well for transferring torque from the wheel to brake components located radially inwardly of the tube well. The torque bar extends generally parallel to the axis of rotation of the wheel and is spaced radially inwardly from the tube well. A heat shield is concentric with and disposed radially inwardly of the tube well, and has an inboard end attached to the tube well. The torque bar includes a coupling device cooperating with a portion of the heat shield at a location axially outwardly remote from the inboard end of the heat shield so as to restrain radial outward movement of the heat shield.

In a preferred embodiment of the invention, the heat shield includes a plurality of circumferentially arranged heat shield sections and a plurality of carriers for removably attaching the heat shield sections to the wheel at respective torque bars. Each carrier has an inboard end attached to the tube well, and the coupling device of the respective torque bar cooperates with a portion of the carrier at a location axially outwardly remote from the inboard end of the carrier so as to restrain radial outward movement of the carrier. The coupling device is located axially between, and preferably midway between, the inboard and outboard ends of the torque bar. The coupling device includes, for example, a button on the torque bar which interconnects with a keyhole in heat shield carriers, or vice versa. The heat shield may also include a radially inwardly projecting offset portion to provide radial spacing, and therefore an air gap, between the heat shield and the torque bar. A preferred coupling device has an enlarged head and a reduced width stem connecting the head to the torque bar, and a preferred keyhole has an enlarged portion dimensioned to receive the head and a reduced width portion for receiving the stem. As is also preferred, the coupling device is advantageously located midway along the circumferential span of the torque bar.

The invention also provides a heat shield carrier for a wheel and brake assembly, which carrier includes an elongated thin strip with an aperture at one end through which a bolt can pass for securing an end of the carrier to a wheel, and a keyhole intermediate the ends of the strip for interconnecting with a button on a torque bar.

Also provided is a novel torque bar for a wheel and brake assembly. The torque bar includes an elongated bar having at one end an aperture through which a bolt can pass for securing an end of the bar to a wheel and configured at its opposite end for attachment to the wheel. A button is located intermediate the length of the bar for coupling with a keyhole in a carrier for a heat shield section.

According to another aspect of the invention, a heat shield assembly for a wheel and brake assembly, comprises a circumferential arrangement of heat shield sections, a plurality of axially extending heat shield carriers between which respective heat shield sections are axially inserted, and at least one retainer removably secured with respect to a respective carrier for blocking axial withdrawal of the heat shield section from respective carriers.

In a preferred embodiment, the retainer is secured to an axial end of the carrier by an axially extending fastener. To this end, the carrier may include a radially extending flange at the axial end thereof. The retainer and flange of the carrier include coacting anti-rotation elements.

Also, at least one of the carriers preferably has an axial stop against which a portion of the respective heat shield section abuts to limit the extent of axial insertion of the heat shield section with respect to the carrier. Each carrier may have on opposite sides thereof upper and lower tabs defining axially extending channels for receiving edge portions of circumferentially adjacent heat shield sections. The axial stop may comprise any suitable projection obstructing axial movement of the heat shield section. An exemplary axial stop is formed by an axial end of one of the tabs of the carrier. In this regard, each heat shield section includes at a side edge thereof a projecting abutment for engaging the axial stop.

According to a further aspect of the invention, a heat shield assembly for a wheel and brake assembly, includes a circumferential arrangement of axially extending heat shield carriers, each carrier having an edge portion defining a capture slot opening circumferentially toward the opposite edge of the carrier, and at least one aperture in the edge portion. A plurality of heat shield sections circumferentially extend between relatively adjacent carriers, and each heat shield section includes at one side thereof a first tab portion circumferentially inserted in the capture slot and at an opposite side thereof a second tab portion engaged in the aperture. As is preferred, the capture slot is formed by reversely bending the edge portion of the carrier back over itself.

In a preferred embodiment, each heat shield section has a relatively thick central insulating portion between the first and second tab portions. The first tab portion includes a first plurality of axially spaced apart tabs which define therebetween respective relief portions, and axially spaced apart apertures are correspondingly sized and axially spaced apart relative to the relief portions such that the first plurality of axially spaced apart tabs align with the respective apertures. The second tab portion includes a second plurality of axially spaced apart tabs which are axially offset in relation to the first plurality of axially spaced apart tabs, and the apertures are correspondingly sized and axially spaced apart relative to the second plurality of axially spaced apart tabs such that the second plurality of axially spaced apart tabs may be aligned with the apertures for radial insertion into the apertures.

According to another aspect of the invention, a wheel and brake assembly comprises a wheel including a tube well having inboard end and outboard ends. A plurality of circumferentially spaced apart torque bars are attached to the tube well for transferring torque from the wheel to brake components located radially inwardly of the tube well. The torque bars extend generally parallel to the axis of rotation of the wheel and are spaced radially inwardly from the tube well. A plurality of heat shield sections extend circumferentially between relatively adjacent pairs of the torque bars. A plurality of axially extending heat shield carriers are attached to the torque bars and therebetween the heat shield sections are retained. The heat shield sections each include a relatively thick insulating portion and relatively thin edge portions at opposite sides of the relatively thick insulating portion. The relatively thick insulating portion spans the space between relatively adjacent torque bars. At least one of the edge portions is connected to a respective carrier and at least one of the edge portions extends between the torque bar and the tube well.

The invention also provides a novel heat shield section for a wheel and brake assembly. The heat shield section includes a relatively thick insulating portion and relatively thin edge portions. One edge portion defines a first tab for insertion into an axial slot in a carrier, and the opposite edge portion includes a second tab for engagement in an aperture in a carrier. The first and second tabs are axially offset in relation to one another.

The foregoing and other features of the invention are hereinafter fully described and particularly pointed out in the claims, the following description and the annexed drawings setting forth in detail illustrative embodiments of the invention, such being indicative, however, of but a few of the various ways in which the principles of the invention may be employed.

BRIEF DESCRIPTION OF THE DRAWINGS

FIG. 4A is a perspective view of a torque bar used in the wheel and brake assembly of FIG. 1.

FIG. 4B is a top view of the torque bar.

FIG. 4C is a longitudinal cross-sectional view of the torque bar taken along the line 4C—4C of FIG. 4B.

FIG. 4D is a bottom view of the torque bar looking from the line 4D—4D of FIG. 4C.

FIG. 4E is an enlarged transverse cross-sectional view of the torque bar taken along the line 4E—4E of FIG. 4B.

FIG. 4F is an end view of the torque bar as viewed from the line 4F—4F of FIG. 4B.

FIG. 6A is a top view of a heat shield used in the wheel and brake assembly of FIG. 1.

FIG. 6B is an end view of the heat shield looking from the line 6B—6B of FIG. 6A.

FIG. 6C is a longitudinal cross-sectional view of the heat shield taken along the line 6C—6C of FIG. 6A.

FIG. 8 is a cross-sectional view of a portion of a wheel and brake assembly according to another embodiment of the invention, showing in particular a heat shield assembly.

FIG. 9 is an arcuate portion of a front/inboard end view of the wheel and brake assembly, looking from the line 9—9 of FIG. 8.

FIG. 10 is an enlarged portion of FIG. 9.

FIG. 15 is a cross-sectional view of a portion of the heat shield assembly of FIG. 13, with one of two relatively adjacent heat shield sections joined with the heat shield carrier.

FIG. 16 is a cross-sectional view similar to FIG. 15, but showing in phantom lines the other relatively adjacent heat shield section joined with the heat shield carrier.

DETAILED DESCRIPTION

The various features and principles of the invention are illustrated by way of three different embodiments, which are described below in detail.

The Embodiment of FIGS. 1–7

Figure 1:
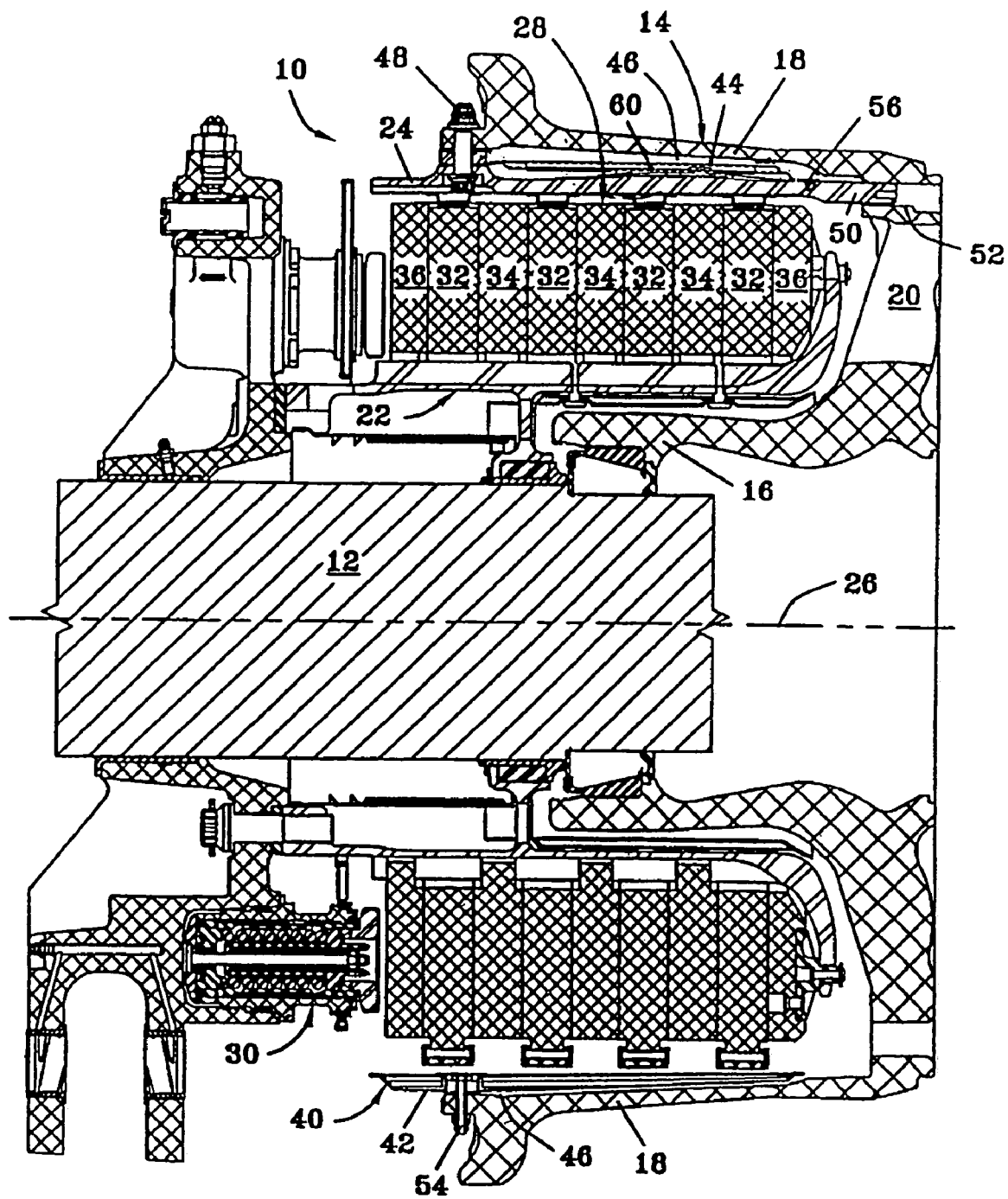
FIG. 1 is a cross-sectional view of a wheel and brake assembly employing a heat shield assembly according to one embodiment of the invention.

Referring now to the drawings in detail and initially to FIGS. 1–6, an exemplary wheel and brake assembly in accordance with one aspect of the present invention is indicated generally by reference numeral 10. In FIG. 1, the aircraft wheel and brake assembly 10 is shown mounted on an aircraft bogie axle 12.

The wheel and brake assembly 10 comprises a wheel 14 (only one wheel-half shown for clarity) having a hub 16 and a tube well 18 concentric with the hub 16, and a web 20 interconnecting the hub 16 and the tube well 18. A torque take-out assembly 22 is aligned with the hub 16, and the wheel 14 is rotatable relative to the torque take-out assembly 22.

Figure 2:
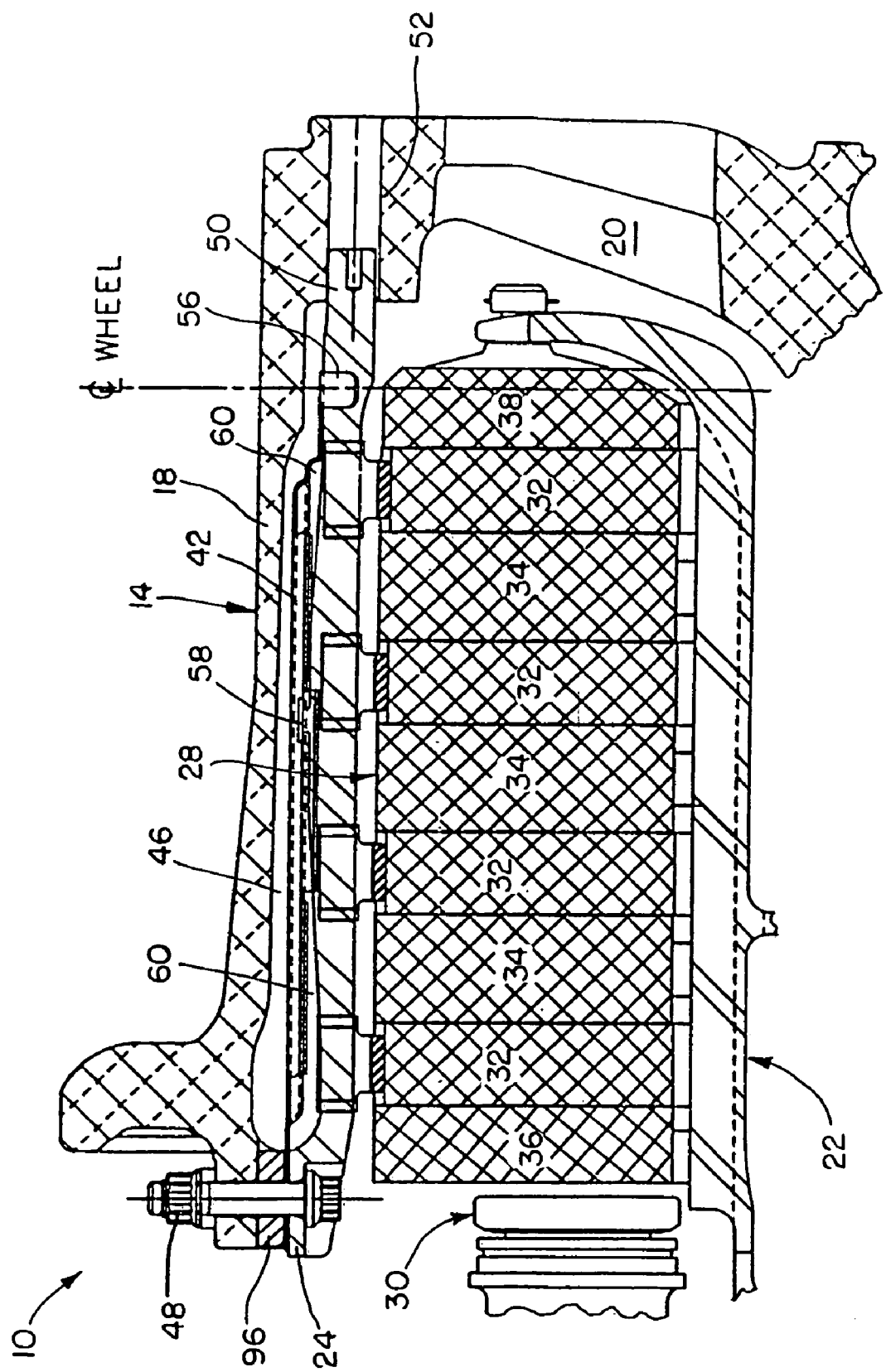
FIG. 2 is an enlarged cross-sectional view of a heat shield assembly shown in relation to the wheel and brake assembly of FIG. 1.

As shown in FIG. 2, a plurality of torque bars 24 are fixed to the wheel 14 generally parallel to the axis of rotation 26 of the wheel and spaced from the tube well 18. A heat sink 28 is disposed within the wheel 14, and comprises brake or friction disks in the form of rotors 32 and stators 34. The rotors 32 are engaged with the torque bars 24 for rotation with the wheel, and the stators 34 are engaged with the torque take-out assembly 22 which is fixed against rotation relative to a landing gear strut (not shown). A pressure plate 36 and an end plate 38 may be positioned at opposite ends of the heat sink 28 and retained against rotation with respect to the torque take-out assembly 22. The friction disks may be formed from any material suitable for friction disks, including metals, such as steel with a sintered metallic friction lining, and ceramics or carbon materials, such as a carbon/carbon material. According to a preferred embodiment, the heat sink 28 is a carbon/carbon composite heat sink having at least one carbon/carbon rotor 32 interleaved with a plurality of carbon/carbon stators 34.

At least one actuator 30 (FIGS. 1 and 2) is provided to compress the heat sink 28. In the example presented, the actuator 30 is a hydraulically actuated piston, but other types of actuators may be used in the practice of the invention, such as electromechanical actuators.

Figure 3:
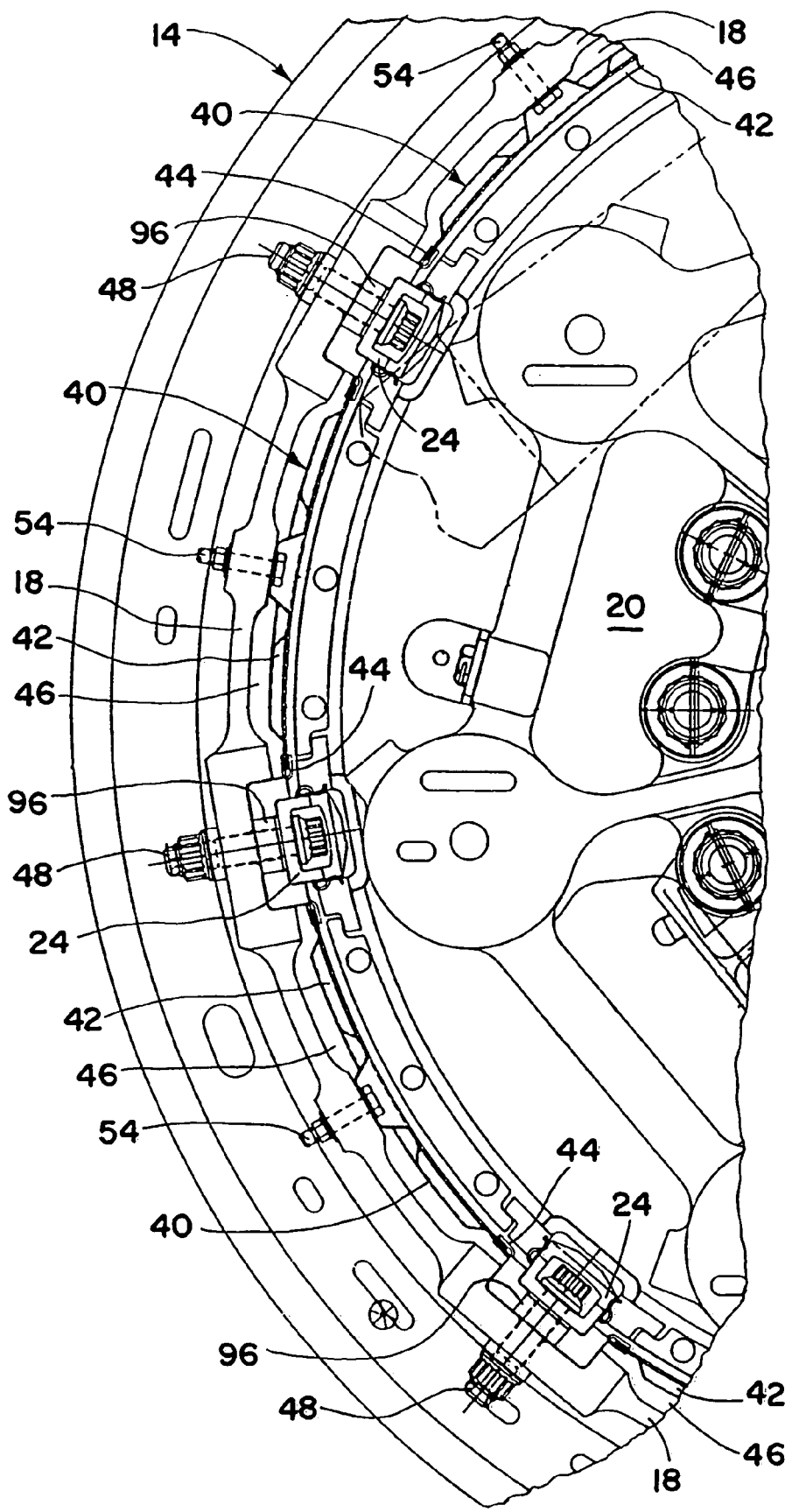
FIG. 3 is an arcuate portion of a front/inboard end view of the wheel and brake assembly of FIG. 1, looking into the wheel from the left side of FIG. 1.

A heat shield 40, according to one aspect of the invention, is attached to the wheel 14 between the tube well 18 and the heat sink 28. As illustrated in FIGS. 1 and 3, the heat shield 40 is concentric with the tube well 18 and has a plurality of heat shield sections 42 disposed between respective, relatively adjacent pairs of torque bars 24. The heat shield sections are spaced from the tube well 18 and secured in place by respective pairs of heat shield carriers 44 that are fixed to the wheel 14 generally parallel to the axis of rotation 26 of the wheel 14 intermediate the torque bars 24 and the tube well 18. The carriers are preferably aligned with respective torque bars, and have "groove-like" side edges that define edge channels for axially receiving and radially constraining side edge tap portions of the heat shield sections, as described below with greater particularity.

The torque bars 24 and heat shield carriers 44 are attached at their axially inboard end to the wheel 14 by torque bar bolts 48. The torque bar bolts 48 extend through respective holes in a flange provided on the wheel as shown, which flange for purposes of the present description is intended to be considered as part of the tube well. Each torque bar 24 preferably has a pin 50 at its axially outboard end (i.e., the end opposite the torque bar bolts 48) that is received within a hole 52 in the web 20 of the wheel.

After axial insertion between respective pairs of carriers 44, the heat shield sections 42 may be secured in place and to the tube well 18 by suitable means, such as fasteners, and more particularly heat shield bolts 54 (FIGS. 1 and 3). Other securement devices may be employed, such as that described below in relation to FIGS. 8–12 or FIGS. 13–16.

The heat shield sections 42 may be damaged such that replacement is needed before scheduled maintenance of the wheel and brake assembly. If this occurs, one or more damaged heat shield sections 42 may be replaced by removing the heat shield bolts 54 for those sections, axially withdrawing the damaged sections from the wheel and heat assembly, inserting new heat shield sections 42, and replacing the heat shield bolts 54. This may be accomplished without removing the torque bars 24, thus greatly facilitating field repair of the heat shield 40.

In FIGS. 4A–4F, details of an exemplary torque bar 24 are shown. Each torque bar 24 is substantially rectangular-shaped in cross-section (FIG. 4F) and has a mounting hole 57 at its axially inboard end that receives the torque bar bolt 48.

In accordance with the invention, each torque bar 24 also includes a coupling device in the form of a button 58 for coupling the heat shield carrier 44 to the torque bar 24 in the below described manner. As best shown in FIGS. 4C and 4E, the illustrated button 58 is T-shaped in cross section and includes a stem portion 59 which extends radially outward from the body of the torque bar 24 to an enlarged, circular-shaped head portion 61. The button 58 is located axially outwardly from the inboard end of the torque bar 24 and preferably is located between the inboard and outboard ends of the torque bar 24. As is also preferred, the button 58 is located along the neutral axis of bending of the torque bar 24 (i.e., the axial line located midway along the circumferential span of the torque bar 24). In the illustrated example, the T-shaped button 58 is located about midway between the inboard end and outboard end of the tube well 18.

As seen in FIGS. 1 and 2, the heat shield carriers 44 are generally radially aligned with the torque bars 24, respectively, and for the most part are radially spaced from the respective torque bars 24. The superposing of the heat shield carriers 44 over the torque bars 24 minimizes radiation heat transfer from the torque bars to the tube well 18. In addition, the space 60 between the torque bars 24 and heat shield carriers 44 is preferably filled with air, and serves to insulate the heat shield carriers 44 from the torque bars 24, and reduces the maximum temperature generated in the heat shield carrier 44 during braking. Reducing the maximum temperature in the heat shield carrier 44 reduces the amount of heat energy radiated to the tube well 18 during braking, thereby increasing the effectiveness of the heat shield 40. The heat shield carriers 44 may have support portions 56 that rest on the torque bars 24 as shown.

The heat shield 40 and the tube well 18 define an annular space 46 therebetween, preferably occupied by air. Preferably, the heat shields 40 and/or carriers 44 are restrained from contact with the tube well 18, thereby to prevent fretting or scoring of the tube well 18 and further to minimize conductive heat transfer to the tube well 18, both of which are undesirable. In accordance with the invention, this spacing is maintained by coupling the heat shield carriers 44 to the torque bars 24 to restrict radial movement of the heat shield carriers 44 at a location axially spaced from the inboard ends of the carriers 44 that are attached to the tube well 18.

In FIGS. 5A–5E it can be seen that a preferred form of heat shield carrier 44 according to an aspect of the invention is preferably generally flat, and may be manufactured by forming or stamping a flat piece of stainless steel (or other suitable material) in a series of operations. The heat shield carrier 44 is generally configured as a flat strip, with an axially extending rib 63 (shown in cross-section in FIG. 5E) and a generally oval-shaped rib 65 projecting radially outwardly from the flat strip. The ribs 63 and 65 provide stiffness in and resist bending of the heat shield carrier 44. The heat shield carrier 44 has a pair of opposite edges 62 which are generally parallel to the axis of rotation 26 of the wheel 14, and may be configured as a groove-like edge. As used herein, the term "groove-like edge" refers to any edge geometry that receives a tongue or tab structure at the sides of the heat shield sections 42 and restrains inward and outward radial movement of the heat shield sections 42. In the example presented, each groove-like edge 62 comprises a pair of axially spaced radially outward tabs 64 and a radially inward tab 66 disposed between the radially outward tabs 64, with the result being an axially extending channel. The radially outward tabs 64 may be disposed at the axially inboard and outboard ends of the heat shield carrier 44 and function to restrain radial movement of an adjacent heat shield section 42 toward the tube well 18. The radially inward tab 66 is axially spaced from the web 20 and configured to restrain radial movement of the heat shield section 42 toward the torque bar 24 and/or heat sink 28. Other configurations for the groove-like edges 62 will become apparent to those skilled in the art, in light of the description provided herein, any of which are considered to fall within the purview of the invention. For example, both the tabs 64 and 66 could extend the full length of the edges 62. However, the example presented is inexpensive to manufacture, and is still effective in restraining radial movement of the heat shield sections 42.

Referring now to FIGS. 6A–6C, each heat shield section 42 preferably comprises an upper sheet 72 and a lower sheet 74. The upper sheet 72 may take the shape of a pan having a lip 76, and is joined to the lower sheet 74 around the circumference of the heat shield section 42 at the lip 76 by suitable means, including spot welding and/or bending a tab from the lower sheet 74 around the lip 76. A portion of the lip 76 preferably forms a pair of opposite tongue-like edges 78 generally parallel to the axis of rotation 26 of the wheel 14 (FIG. 1). Joints that permit relative movement induced by thermal expansion and contraction are generally employed, where possible, to provide thermal stress relief and minimize thermal stress warpage of the heat shield section 42. In the example presented, tabs from the lower sheet 74 are bent around the lip 76 along edges 78 without rigidly fixing the upper sheet 72 and lower sheet 74 to each other in order to permit relative movement due to thermal expansion and contraction. The upper sheet 72 and lower sheet 74 at one or both of end portions 80 of lip 76 may be rigidly fixed by suitable means, including spot and seam welding. Welding only one end portion 80 of lip 76 provides the maximum amount of movement for thermal expansion and contraction. In such case, tabs (not shown) from the lower sheet 74 are bent around only one end portion 80 of lip 76 opposite the end portion 80 that is welded. In practice however, bending tabs from the lower sheet 74 around an arcuate end portion 80 is difficult and increases manufacturing cost, and a heat shield section 42 having the upper sheet 72 and lower sheet 74 welded together at both end portions 80 has been found to be sufficiently resistant to thermal stress warping. A cup 82 may be inserted through a corresponding hole in the lower sheet 74 and be rigidly fixed to the lower sheet 74 by suitable means, including spot welding.

When completed, the upper sheet 72 and lower sheet 74 define a space 84 therebetween. The cup 82 may be configured to help maintain a desired spacing between the upper sheet and 72 and lower sheet 74 by defining a ledge 84 that rests against the upper sheet 72. The space 86 may be filled with only air, but is preferably filled with a suitable insulating material 88, for example, a ceramic paper. If filled with air, a thin stainless steel foil may be provided as a radiant heat barrier between the upper sheet 72 and lower sheet 74. The stainless steel foil may be dimpled to maintain its position between the upper and lower sheets 72 and 74. The cup 82 provides a heat shield mounting hole 90 for receiving a heat shield bolt 54 (FIG. 1) that fixes the heat shield section 42 to the wheel 14. A raised bearing surface 92 may also be provided to help ensure that the bulk of the heat shield section 42 is spaced from the tube well 18. The upper sheet 72, the lower sheet 74, and the cup 82 are preferably formed from a stainless steel alloy. The heat shield section 42 may be flat or curved (arcuate), but is preferably curved in order optimize space inside the wheel and brake assembly 10, as presented in the drawings. Configuring the heat shield sections 42 in the manner described herein permits the heat shield sections 42 to closely follow the geometry of the tube well 18 and optimize heat shield geometry to maximize heat shielding in the available space.

Figure 7:
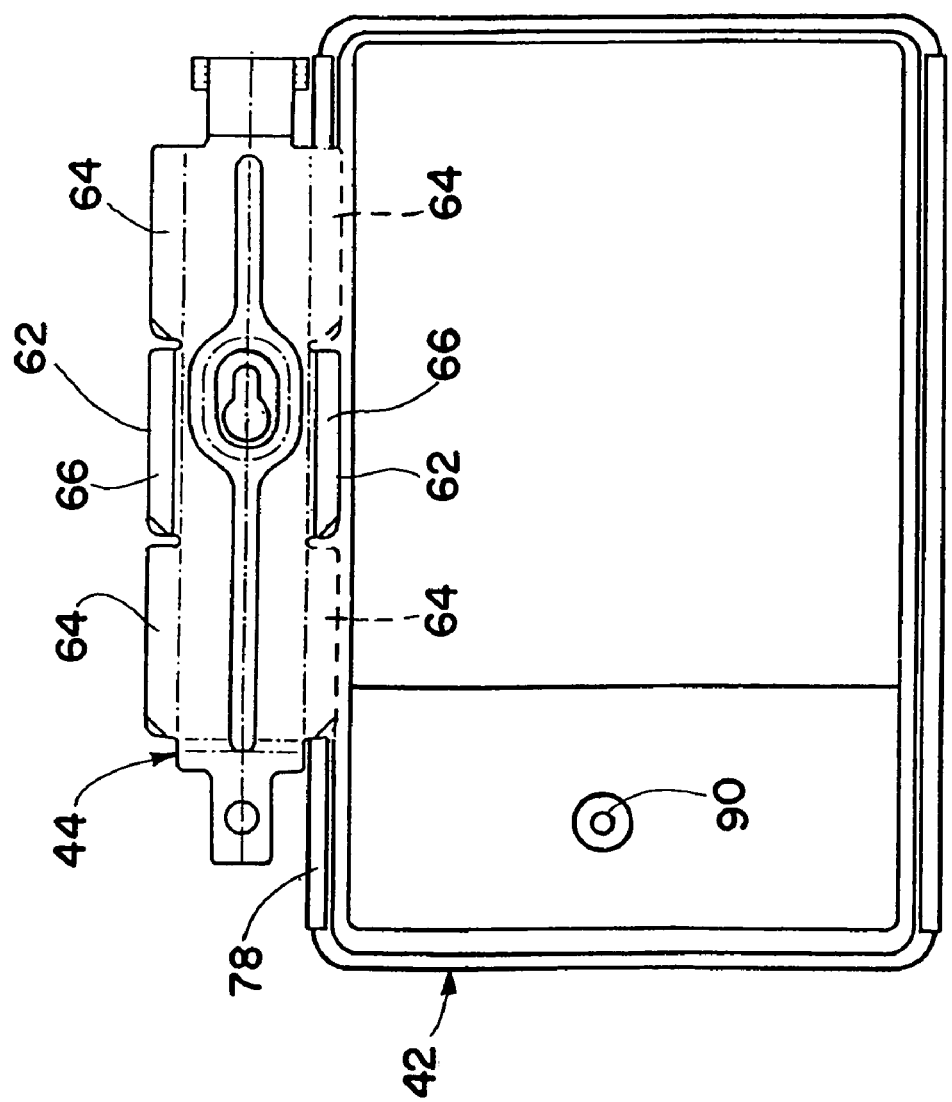
FIG. 7 is a top view of the heat shield section engaged with the heat shield carrier.

In FIG. 7, the heat shield section 42 is shown engaged with an adjacent elongate heat shield carrier 44. The opposite edges 62 of the heat shield carrier 44 are configured as groove-like edges, and receive the tongue-like edges 78 of the heat shield section 42. Tabs 64 are configured to restrain radial movement of the heat shield section 42 toward the tube well 18 (FIGS. 1 and 2), and tab 66 is configured to restrain radial movement of the heat shield section 42 toward the torque bar 24 (FIGS. 1 and 2). Thus, the opposite edges 62 of the heat shield carrier 44 are configured to cooperate with the heat shield sections 42 to restrain radial movement of the heat shield sections 42. The opposite edges 62 of the heat shield carrier 44 also cooperate with the heat shield sections 42 to restrain rotation of the heat shield sections 42 around the heat shield bolts 54. The distance between the tongue-like edges 78 is dimensioned to allow circumferential thermal expansion and contraction of the heat shield sections 42 when installed between the heat shield carriers 44. Other geometric configurations will become evident to those skilled in the art, and any such variations are considered to fall within the purview of this invention.

Figure 5A:
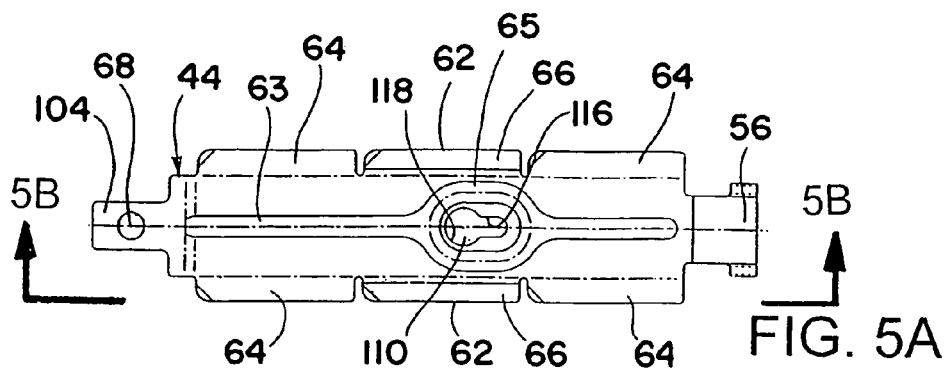
FIG. 5A is a top view of a heat shield carrier used in the wheel and brake assembly of FIG. 1.
Figure 5B:
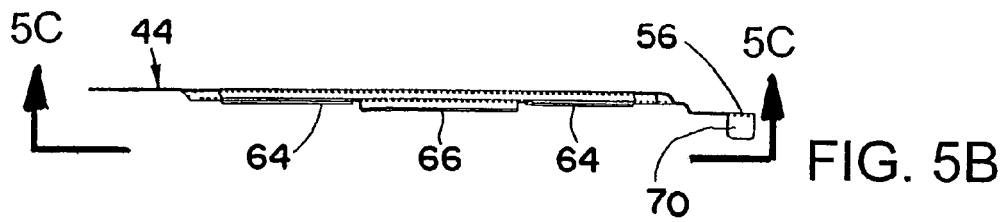
FIG. 5B is a side elevational view of the heat shield carrier of FIG. 5A looking from the line 5B—5B of FIG. 5A.
Figure 5C:
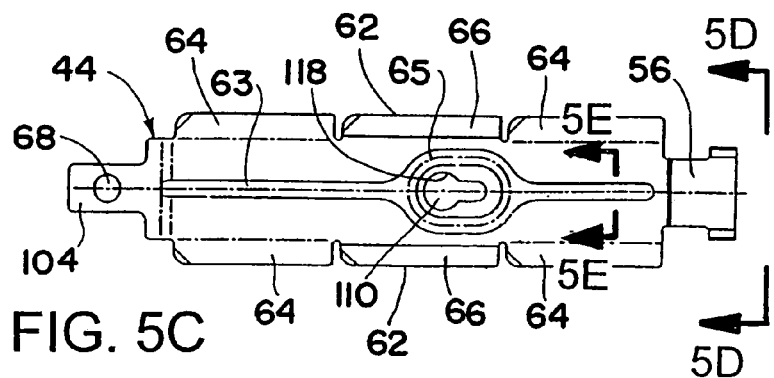
FIG. 5C is a bottom view of the heat shield carrier looking from the line 5C—5C of FIG. 5B.
Figure 5D:
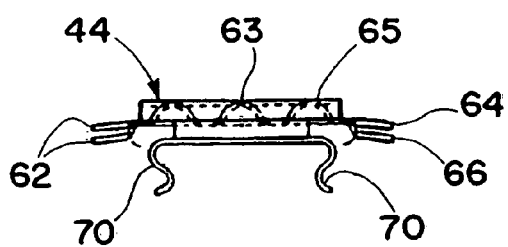
FIG. 5D is an end view of the heat shield carrier as viewed from the line 5D—5D of FIG. 5C.
Figure 5E:
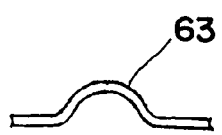
FIG. 5E is a partial transverse cross-sectional view of the heat shield carrier taken along the line 5E—5E of FIG. 5C.

Reverting to FIGS. 5A–5C, a mounting hole 68 that receives the torque bar bolt 48 is provided in a mounting portion 104 of the heat shield carrier 44. As best seen in FIGS. 2 and 3, the mounting portion 104 is sandwiched between the torque bar 24 and the insulating spacer 96 which spaces the carrier 44 and torque bar 24 from the wheel 14 at the attachment location.

The support portion 56 is formed as a tab offset from the body of the heat shield carrier 44 for providing the above-mentioned spacing between the body of the heat shield carrier 44 and the torque bar 24 at the outboard end of the carrier 44 which is located deep within the well 18 of the wheel 14. The support portion 56 has a pair of radially inwardly extending ears 70 (FIGS. 5B and 5D) for engaging therebetween the torque bar 24, thereby holding the outboard end of the carrier 44 against circumferential shifting movement relative to the torque bar 24.

The heat shield carrier is provided with an aperture and more particularly a keyhole 110 for receiving and coupling with the button 58 of the torque bar 24. The keyhole 110 is thus located axially between the inboard end and outboard end of the tube well 18. The keyhole 110 has a combined geometry of an axially extending slot 116 at its axially outboard end and a round hole 118 at the inboard end of the keyhole 110. The slot 116 has a width about equal to the stem 59 of the button 58 and less than the head 61 of the button 58, and the hole 118 has a diameter larger than the diameter of the head 61 of the button 58 for allowing passage therethough of the head 61 of the button 58.

Accordingly, each carrier 44 can be assembled in place by first axially positioning the carrier 44 with respect to a torque bar 24 such that the keyhole 110 aligns with the head portion 61 of the button 61 on the torque bar 24. At this point the head portion 61 of the button 58 can be radially inserted into the hole 118 of the keyhole 110 and then the carrier 44 and torque bar 24 can be shifted axially relative to one another to move the stem portion 59 along the length of the slot 116 of the keyhole 110 and thereby engage the carrier 44 with respect to the torque bar 24. Also, the carrier 44 and torque bar 24 are relatively axially shifted to align the hole 68 in the carrier 44 with the hole 57 in the torque bar 24, after which the carrier 44 and torque bar 24 can be secured to the wheel 14 in the above-described manner. When thus assembled, the head 61 of the button 58 will restrain radial outward movement of the carrier 44 at a point axially offset from the inboard end of the carrier 44, thereby preventing portions of the carrier 44 and the heat shield 42 located deep within the well 18 of the wheel 14 from scoring or otherwise degrading the wheel 14. With such a configuration, the head portion 61 of the button 58 reacts against the centripetal forces on the heat shield carrier 44 during wheel spin-up. In addition, such arrangement eliminates the need for using resilient bumpers to locate the heat shield carrier 44 deep within the tube well 18 of the wheel 14.

It will be appreciated by those skilled in the art that alternative coupling devices may be employed to couple the heat shield carrier 44 to the torque bar 22 for restraining radial movement of the carrier 44 within the well 18 of the wheel 14, and such alternatives are contemplated as falling within the scope of the present invention. For example, the torque bar 24 may include a reversely bent tab, or hook, that fits into an aperture, or slot, in the carrier 44 and engages the carrier 44 as the carrier 44 is axially moved along the torque bar 24. As in the above-described embodiment, the tab restrains radial movement of the heat shield carrier 44 toward the tube well 18.

While the heat shield 40 has been described herein as including a plurality of circumferentially arranged heat shield sections 42 and a plurality of heat shield carriers 44, those skilled in the art will appreciate that the heat shield may comprise a full circle heat shield or heat shield segments with circumferentially plural torque bars. Such heat shields and heat shield segments may be equipped with one or more devices, such as inter-engaging slots and tabs, which will function to restrain the outboard end and/or intermediate portion of the heat shield or heat shield segments against radially movement.

The Embodiment of FIGS. 8–11

Referring now to FIGS. 8–11, another embodiment of a wheel and brake assembly according to the invention is indicated generally by reference numeral 200. Except for the differences described below, the wheel and brake assembly 200 may be similar to the wheel and brake assembly 10 and like reference numerals are used to denote like parts and features.

The wheel and brake assembly 200 includes a heat shield assembly 204 that is concentric with the tube well 18 and has a plurality of heat shield sections 212 disposed between adjacent torque bars 214 and spaced from the tube well 18, and a plurality of heat shield carriers 216 fixed to the wheel 14 generally parallel to the axis of rotation 26 of the wheel 14 intermediate the torque bars 214 and the tube well 18. The heat shield carriers 216 are mounted to the wheel flange of the wheel 14 at their axially inboard ends by torque bar fasteners 48 and extend axially into the tube well 18. The heat shield carriers 216 include groove-like edges 62 which receive tongue-like side edges 78 of the heat shield sections 212 to restrain the heat shield sections 212 from radial movement. Unlike the afore-described heat shield carriers 44, the heat shield carriers 216 may include resilient bumpers 220 at their axially outboard ends. The resilient bumpers 220 contact the tube well 18 and restrain radial movement of the heat shield carriers 216 and, accordingly, the heat shield sections 212 engaged by the heat shield carriers 216. During wheel spin up, when the heat shield sections 212 and heat shield carriers 216 are forced radially outwardly, the resilient bumpers 220 protect the tube well 18 from abrasion. It will be appreciated that, as an alternative to the resilient bumpers 220, the torque bars 214 and carriers 216 may include respective coupling devices, such as the above described buttons 58 and keyholes 110, as in the above-described manner.

As best shown in FIG. 8, the heat shield carrier 216 has an inboard end portion that extends axially beyond the torque bar 212 and then radially to define a mounting flange 230. A retainer 234 is mounted to the outer side of the mounting flange 230 by a fastener 236 or other suitable means. In the illustrated embodiment, a nut plate 240, which includes a self-locking nut for receiving the fastener 236, is attached to the axially outboard side of the end flange 230 preferably by a pair of rivets 242. The rivets 242 extend through respective apertures in the retainer 234 to provide an anti-rotation feature, preventing the retainer 234 from rotating relative to the heat shield carrier 216. Other anti-rotation means may be employed if desired.

Figure 11:
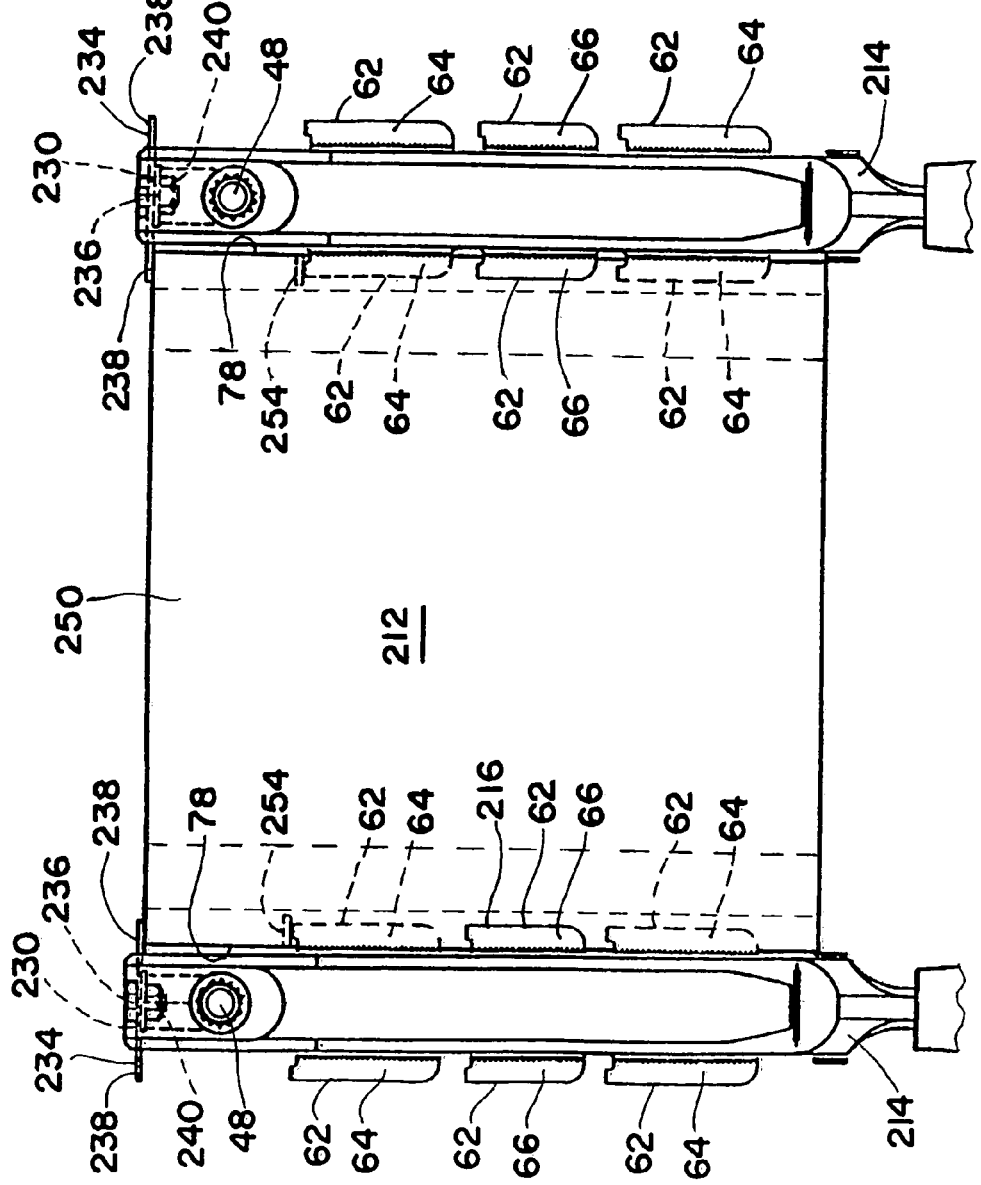
FIG. 11 is a plan view looking from line 11—11 of FIG. 8.

As seen in FIGS. 10 and 11, the retainer 234 includes a pair of circumferentially spaced ears or tabs 238 extending in opposite directions for blocking axial withdrawal (i.e., in the axially inboard direction) of the heat shield section 212 from the respective heat shield carriers 216. Each heat shield section 212 includes a generally arcuate shaped base portion 250 and abutments 254 projecting radially outwardly from the tongue-like side edge portions 78 of the base portion 250. The abutments 254 abut the tabs 64 of the groove-like edges 62 of the heat shield carriers 216. In this manner the heat shield sections 212 are constrained against axial movement.

Like the afore-described heat shield assembly 40, the heat shield assembly 204 enables installation and removal of a heat shield section 212 without removal of the torque bars 214. However, since the heat shield section 212 is axially confined as above-described, no longer must the heat shield section 212 be secured by a fastener to the tube well 18 of the wheel 14, thereby eliminating the conduction heat flow path provided by the fastener.

Figure 12:
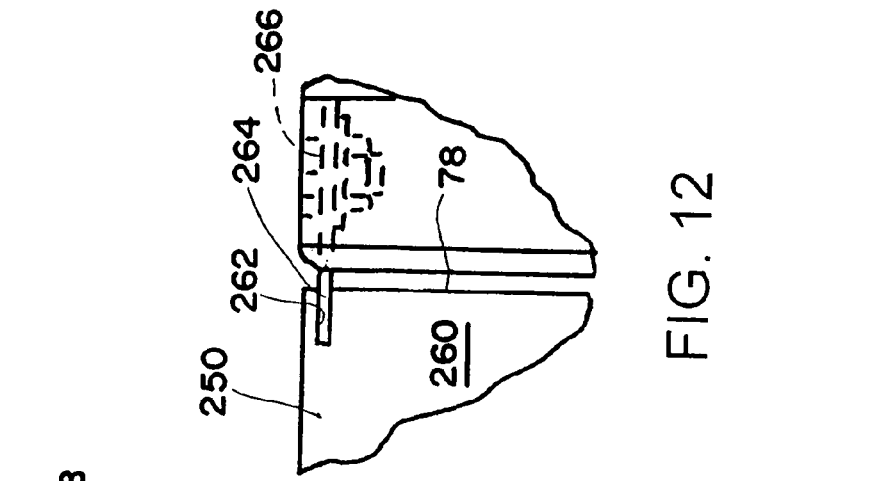
FIG. 12 illustrates an alternative arrangement for axially coupling the heat shield section to the heat shield carrier.

It will be appreciated by those skilled in the art that the retainers 234 could include a single tab 238 for retaining a respective heat shield section 212, in which case only one side edge portion 78 of the heat shield section 212 is axially restrained. A pair of tabs 238, however, provides the advantage of redundancy. It will also be appreciated that the axial retaining feature of the retainer 234 may be accomplished by alternative geometries or projections, and such alternatives are contemplated as falling within the purview of the present invention. For example, as is illustrated in FIG. 12, a heat shield section 260 may include a slot 262 in one of the side edge portions 78 thereof, which slot 262 is sized to receive therein a tab 264 of a retainer 266. With such arrangement, the tab 264 functions to axially restrain the heat shield section 260 in both the axially inboard and outboard directions. It is noted that the FIG. 12 arrangement does not provide the advantage of redundancy, as the illustrated retainer 266 only includes a single tab 264. It will be appreciated that, although less practical from an assembly standpoint, redundancy may be achieved by providing the retainer 266 with a pair of tabs 264 (as shown in the FIG. 11 embodiment) and the heat shield sections 260 with slots 262 in both side edge portions 78 thereof.

The Embodiment of FIGS. 13–16

Figure 13:
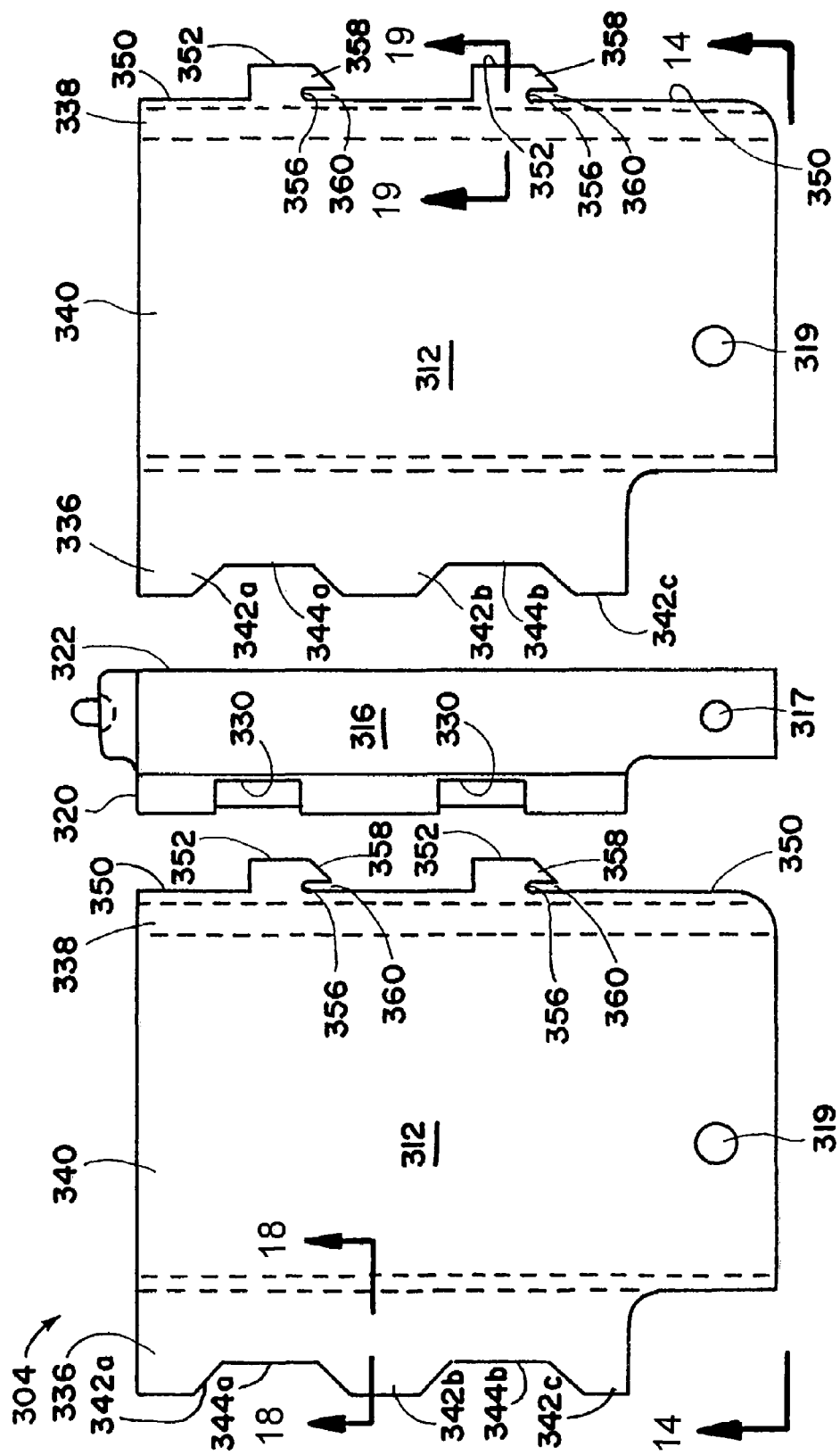
FIG. 13 is a top view of a heat shield assembly according to a further embodiment of the invention, the heat shield assembly being shown in an unassembled condition.
Figure 14:
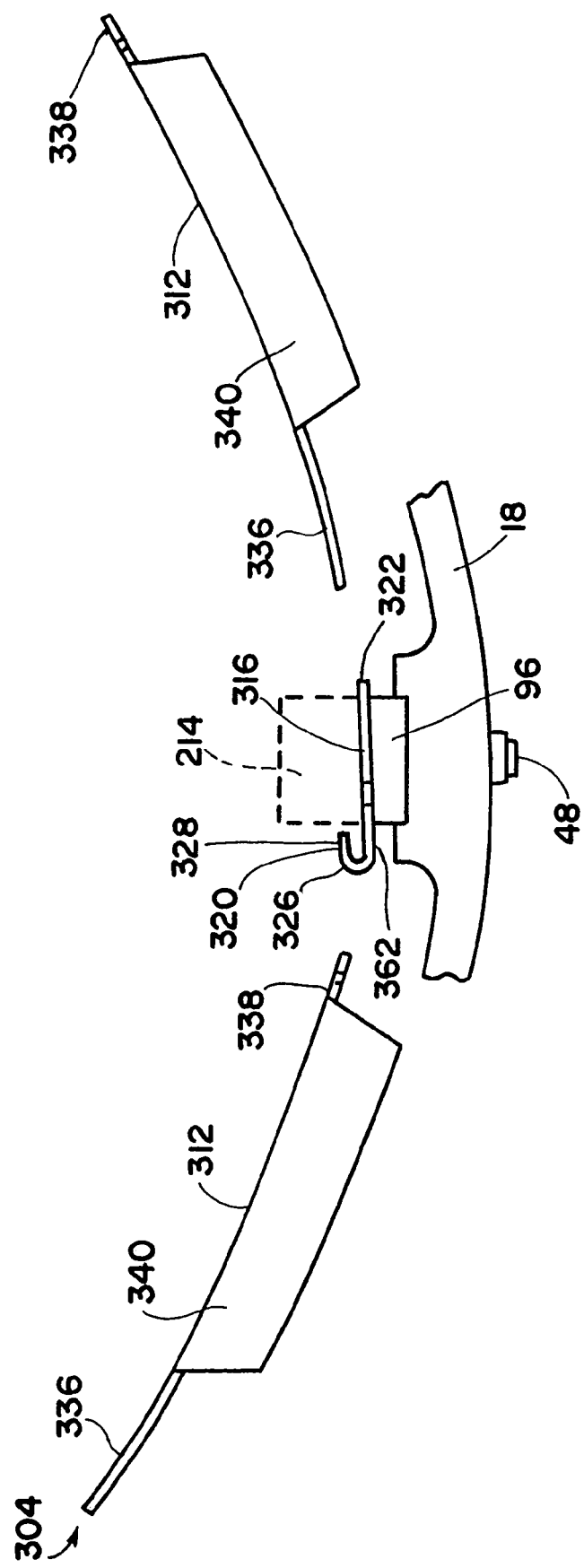
FIG. 14 is an end view of the heat shield assembly of FIG. 13, looking from the line 14—14 of FIG. 13, the heat shield assembly being shown relative to a tube well and torque bar.
Figure 17:
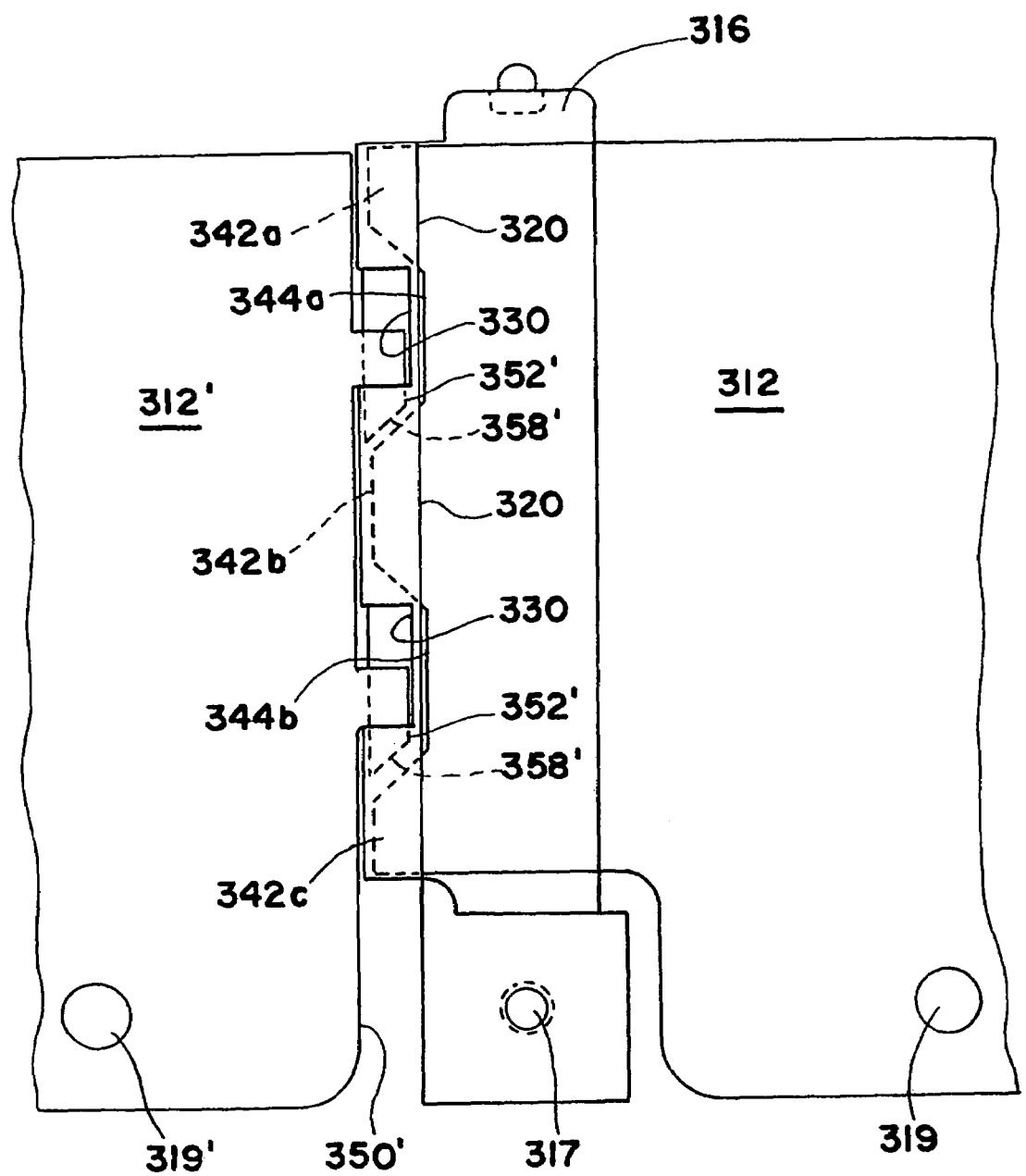
FIG. 17 is a radially outward view of the heat shield assembly of FIG. 16, looking from the line 17—17 of FIG. 16.

Referring now to FIGS. 13–16, there is shown a heat shield assembly 304 of a wheel and brake assembly according to another aspect of the invention. FIGS. 13 and 14 show the heat shield assembly 304 in an unassembled condition, and FIGS. 15 and 16 show the heat shield assembly 304 in a partially assembled condition. Except for the differences described below, the heat shield assembly 304 forms part of a wheel and brake assembly that is similar to the wheel and brake assemblies 10 and 200. Throughout the figures, like reference numerals designate like or corresponding parts.

Like the afore-described heat shield assembly 204, the heat shield assembly 304 is concentric with the tube well 18 and has a plurality of heat shield sections 312 disposed between relatively adjacent torque bars 214 and a plurality of heat shield carriers 316 fixed to the wheel 14 and spaced from the tube well 18. The heat shield carriers 316 extend generally parallel to the axis of rotation 26 of the wheel 14 between the torque bars 214 (shown in dashed lines) and the tube well 18. The heat shield carriers 316 are mounted at holes 317 to the wheel 14 at their axially inboard ends by torque bar fasteners 48 and extend axially into the tube well 18. The heat shield sections 312 are mounted at holes 319 to the tube well 18 at their axially inboard ends by the heat shield fasteners 54 (not shown) and extend circumferentially between relatively adjacent heat shield carriers 316.

In the illustrated exemplary embodiment, each heat shield carrier 316 includes a reversely bent side edge portion 320 that is J-shaped in cross-section and defines an inwardly opening, axially extending capture slot 324. The other or opposite side edge portion 322 of the carrier 316 is relatively flat. The width of the heat shield carrier 316 is such that when the inboard end of the heat shield carrier 316 is mounted to a torque bar 214 the bent side edge portion 320 preferably extends circumferentially beyond the axial edge of the torque bar 214.

The bent side edge portion 320 of the heat shield carrier 316 has extending therethrough one or more apertures 330. In the illustrated embodiment, two apertures 330 are axially spaced apart along the length of the side edge portion 320. The apertures 330 extend circumferentially through the radially extending wall portion 326 of the side edge portion 320 and also radially through the radially inward wall portion 328 of the bent side edge portion 320.

Figure 18:
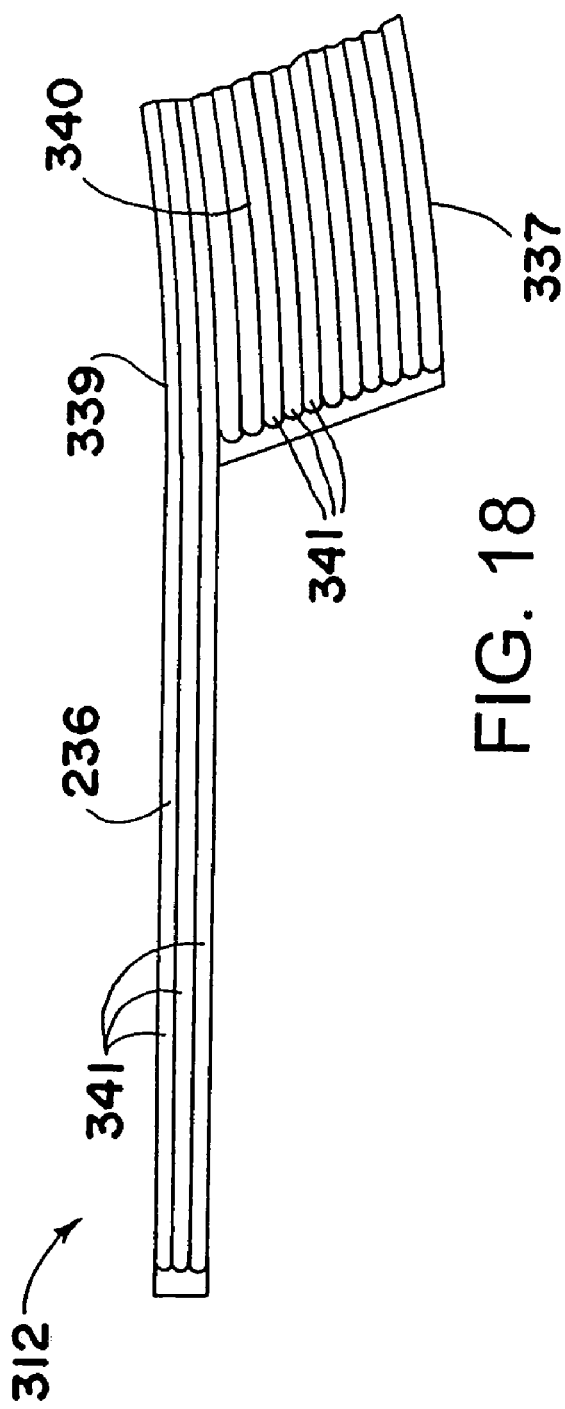
FIG. 18 is a fragmentary cross-sectional view of a heat shield taken along the line 18—18 of FIG. 13.
Figure 19:
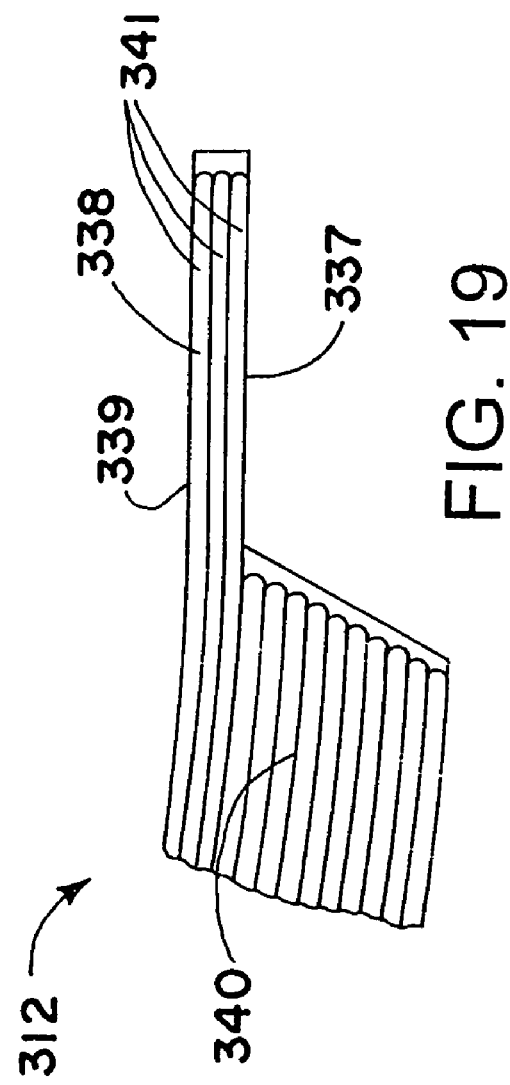
FIG. 19 is a fragmentary cross-sectional view of a heat shield taken along the line 19—19 of FIG. 13.

Each heat shield section 312 includes opposite insulating side edge portions 336 and 338, and a relatively thick insulating portion 340 between the insulating side edge portions 336 and 338. The heat shield section 312 may be manufactured of the same materials and constructed in a manner similar to that of the above-described heat shield sections 42 or 204. For example, as shown in FIGS. 18 and 19, which are cross-sectional views of the insulating side edge portions 336 and 338, respectively, as well as a portion of the central insulating portion 340, the space between upper 337 and lower sheets 339 of the heat shield section 312 may be filled with ceramic paper 341. Alternatively, as above-mentioned, the space may be filled with air, in which case the air would function as the insulator. It will be appreciated that the upper 337 and lower sheets 339 themselves also provide insulation, even without ceramic paper or air therebetween.

The side edge portion 336 has one or more circumferentially extending tabs 342. In the illustrated embodiment, three axially spaced-apart tabs 342a–c are provided and define therebetween respective relief portions 344a and 344b. Alternatively, the side edge portion could be viewed as a single flange or tab which is provided with one or more repliers for the reasons hereinafter described.

The other side edge portion 338 of each heat shield section 312 has an outer side edge 350 from which project one or more tabs 352. In the illustrated embodiment, two axially spaced-apart tabs 352 are provided. Each tab 352 has an axially extending hook portion 358 extending generally parallel to the adjacent outer side edge 350 and circumferentially spaced from the outer side edge 350 to form an axially opening slot 360. In the illustrated embodiment the slots 360 open towards the inboard end of the carrier 316 as is preferred.

As seen in FIG. 13, tabs 352 and apertures 330 are correspondingly sized and axially spaced apart such that the tabs 352 can be aligned with the apertures 330 for radial passage into the apertures 330. After the tabs 352 have been inserted into the apertures 330, the heat shield section 312 is shifted axially inwardly to engage the hook portion 358 under the radially inner wall 328 of the side edge portion 320 of the carrier 316. In this manner, the tabs 352 can be radially restrained between the radially inner wall 328 of the side edge portion 320 and the radially outer wall of the apertures 330 or radially outer wall portion 362 of the side edge portion 320, whereby the carrier 316 will restrain radial movement the thus interlock side 338 of the heat shield section 312.

As also seen in FIG. 13, the apertures 330 and the repliers 344a–b are correspondingly sized and axially spaced apart such that when the tabs 342a–c are inserted into the slot 324 formed by the side edge portion 320 of the carrier 316, the repliers 344a–b will generally align with the apertures 330. Also, the repliers 344a–b are of sufficient size to avoid interference with the tabs 352 when the latter are inserted into the apertures 330 and engaged with the carrier 316.

In FIG. 15, the side edge portion 336 of the heat shield section 312 is shown inserted into the slot 324 of the side edge portion 320 of the carrier 316. To accomplish this, the heat shield section 312 is first inserted axially into the tube well 18 of the wheel 14 towards the outboard end of the wheel 14. The side edge portion 336 is then circumferentially inserted into the capture slot 324 of the bent side edge portion 320 of the carrier 316. Simultaneously, the tabs 352 on the opposite side edge portion 338 of the heat shield section 312 are axially aligned with the apertures 330 in the side edge portion 320 of the there-adjacent heat shield carrier 316, after which the heat shield section 312 can be pivoted radially outwardly to move the tabs 352 into the apertures 330 and fully seat the side edge portion 336 of the heat shield section 312 in the slot 324 of the other carrier 316. The side edge portion 320 of the heat shield carrier 316 in this manner securely engages the tabs 342a–c of the heat shield section 312 to restrain radially outward and inward movement of the side edge portion 336 of the heat shield section 312.

Referring now to FIG. 16, solid lines are used to show a heat shield section 312 already installed in relation to a heat shield carrier 316 as in the manner shown in FIG. 15, while phantom lines are used to show the manner in which a next adjacent heat shield section 312' (differentiated by the use of primed reference numbers) is installed in relation to the same heat shield carrier 316. As above described, the tabs 352' on the side edge portion 338' of the heat shield section 312' are axially aligned with the apertures 330 in the side edge portion 320 of the there-adjacent heat shield carrier 316, after which the heat shield section 312' can be pivoted radially outwardly to move the tabs 352' into the apertures 330. At this point the tabs 352' will lie in the plane of the capture slot 324 of the side edge portion 320. The heat shield section 312' is then moved axially towards the inboard end of the wheel 14, whereby the hook projections 358' of the tabs 352' will be radially captured by the side edge portion 320 of the carrier 316. Once fully engaged, the tabs 352' securely engage the carrier 316 thereby restraining the side edge portion 338' of the heat shield section 312' against radially outward and inward movement. Also, the bolt 54 secures the heat shield section 312' against axial movement.

The just-described mounting arrangement of a heat shield section 312 between relatively adjacent carriers 316 enables both reduced thickness insulated side edge portions 336 and 338 of the respective adjacent heat shield sections 312 at the common carrier 316 to be radially restrained over a relatively small circumferential span and in the same capture plane, as is preferred. However, other arrangements are also contemplated although less desirable. For example, the side edge portion 336 may be a straight edge (i.e., without tabs and intermediate relief portions) which, when inserted circumferentially into the bent side edge portion 320, extends only partially into the capture slot 324, leaving enough circumferential space for the hook tabs 352 to slide into the capture slots 324 and engage with the side edge portion 320 of the carrier 316.

As illustrated in FIGS. 14 and 16, the above-described mounting arrangement enables the insulating side edge portions 336 and 338 and the relatively thick insulating portion 340 of each heat shield section 312 to span not only the circumferential space between relatively adjacent torque bars 214 but also to extend between the torque bar 214 and the tube well 18. This enables heat shielding substantially equivalent to that provided by a single tubular heat shield that circumscribes all of the torque bars 214, while providing the benefits afforded by the use of plural heat shield sections.

Although the invention has been shown and described with respect to certain embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A heat shield assembly for a wheel and brake assembly, comprising:
   a circumferential arrangement of axially extending heat shield carriers, each carrier having an edge portion defining a capture slot opening circumferentially toward the opposite edge of the carrier, and at least one aperture in the edge portion; and
   a plurality of heat shield sections circumferentially extending between relatively adjacent carriers, each heat shield section including at one side thereof a first tab portion circumferentially inserted in the capture slot and at an opposite side thereof a second tab portion engaged in said aperture.

2. A heat shield assembly as set forth in claim 1, wherein each heat shield section has a relatively thick central insulating portion between the first and second tab portions.

3. A heat shield assembly as set forth in claim 1, wherein the first tab portion includes a first plurality of axially spaced apart tabs which define therebetween respective relief portions, and the at least one aperture comprises a plurality of axially spaced apart apertures which are correspondingly sized and axially spaced apart relative to the relief portions such that the first plurality of axially spaced apart tabs align with the respective apertures.

4. A heat shield assembly as set forth in claim 3, wherein the second tab portion includes a second plurality of axially spaced apart tabs which are axially offset in relation to the first plurality of axially spaced apart tabs, and the plurality of axially spaced apart apertures are correspondingly sized and axially spaced apart relative to the second plurality of axially spaced apart tabs such that the second plurality of axially spaced apart tabs may be aligned with the apertures for radial insertion into the apertures.

* * * * *